United States Patent
Qu et al.

(10) Patent No.: US 10,790,877 B2
(45) Date of Patent: Sep. 29, 2020

(54) CARRIER COMMUNICATION METHOD, DEVICE AND SYSTEM FOR LOW-VOLTAGE POWER LINE

(71) Applicant: Triductor Technology (Suzhou) Inc., Jiangsu (CN)

(72) Inventors: Junjie Qu, Jiangsu (CN); Yaolong Tan, Jiangsu (CN)

(73) Assignee: Triductor Technology (Suzhou) Inc., Suzhou Jiangsu (CN)

( * ) Notice: Subject to any disclaimer, the term of this patent is extended or adjusted under 35 U.S.C. 154(b) by 0 days.

(21) Appl. No.: 16/471,560

(22) PCT Filed: May 9, 2017

(86) PCT No.: PCT/CN2017/083546
§ 371 (c)(1),
(2) Date: Jun. 19, 2019

(87) PCT Pub. No.: WO2018/113166
PCT Pub. Date: Jun. 28, 2018

(65) Prior Publication Data
US 2019/0356355 A1    Nov. 21, 2019

(30) Foreign Application Priority Data

Dec. 20, 2016  (CN) .......................... 2016 1 1185119

(51) Int. Cl.
*H04B 3/54*          (2006.01)
(52) U.S. Cl.
CPC ..................................... *H04B 3/54* (2013.01)
(58) Field of Classification Search
CPC .... H04B 2203/5416; H04B 2203/5466; H04B 3/54; H04B 3/542; H04B 3/546; H04L 27/2602; H04L 1/0618; H04L 27/2626
See application file for complete search history.

(56) References Cited

U.S. PATENT DOCUMENTS

| 6,069,556 | A | * | 5/2000 | Chaffanjon | H02J 13/0075 |
| | | | | | 370/296 |
| 9,184,794 | B1 | * | 11/2015 | Ibrahim | H04L 7/042 |

(Continued)

FOREIGN PATENT DOCUMENTS

| CN | 101325438 A | 12/2008 |
| CN | 101438521 A | 5/2009 |

(Continued)

OTHER PUBLICATIONS

International Search Report, PCT Patent Application No. PCT/CN2017/083546, dated Sep. 22, 2017, 3 pages.

(Continued)

*Primary Examiner* — David S Huang
(74) *Attorney, Agent, or Firm* — Adam R. Stephenson, Ltd.

(57) ABSTRACT

Disclosed in the present invention is a carrier communication method, device and system of low-voltage power lines, wherein, the carrier communication method includes: acquiring communication data comprising user data transmitted during communication and frame control data for assisting decoding of the user data; encoding the communication data using orthogonal space-time block codes and generating multipath transmission signals, in the case of unknown channel status; and transmitting the multipath transmission signals to an electric energy meter respectively via three-phase power lines. The present invention fully employs the characteristic of distinct inter-phase coupling of electrical signals at medium-and-high frequencies along power lines, and adopts various space-time encoding and decoding technologies, thereby improving the reliability of power line carrier communication between the concentrator and the electric energy meter.

7 Claims, 6 Drawing Sheets

(56) References Cited

U.S. PATENT DOCUMENTS

| | | | |
|---|---|---|---|
| 2004/0120416 A1* | 6/2004 | Pauli | H04B 7/0669 375/267 |
| 2009/0154582 A1 | 6/2009 | Diao | |
| 2011/0026621 A1* | 2/2011 | Kim | H04B 3/56 375/260 |
| 2014/0023153 A1 | 1/2014 | Kol | |

FOREIGN PATENT DOCUMENTS

| | | |
|---|---|---|
| CN | 101689043 A | 3/2010 |
| CN | 101729098 A | 6/2010 |
| CN | 105450259 A | 3/2016 |
| CN | 106100697 A | 11/2016 |
| CN | 106506047 A | 3/2017 |
| EP | 2019496 A1 | 1/2009 |
| WO | 2015061528 A1 | 4/2015 |

OTHER PUBLICATIONS

Written Opinion of the International Searching Authority, PCT Patent Application No. PCT/CN2017/083546, dated Sep. 22, 2017, 5 pages.

Liu, Bingqi, Research on Space-time Coding Technology in PLC Communication System, MIMO PLC, May 31, 2014, 13 pages.

Papaioannou, Anna et al., Hybrid ARQ Combined with Distributed Packet Space-time Block Coding for Multicast Power-line Communications, IEEE Transctions of Power Delivery, 23(4), Jun. 30, 2008, 8 pages.

Wang, Haiyang, Study of Orthogonal Space-time Coding System Based on Codebook's Limited Feedback Technique, MIMO PLC, Section 3.5, Jun. 30, 2008, 4 pages.

Baoyu, Tian, Engineering Information Theory, Beijing University of Posts and Telecommunications Press, Aug. 2004, 6 pages.

* cited by examiner

CARRIER COMMUNICATION METHOD, DEVICE AND SYSTEM FOR LOW-VOLTAGE POWER LINE

CROSS REFERENCE TO RELATED APPLICATIONS

This document claims the benefit of the filing date of Chinese Patent application No. 201611185119.6 to Qu et al, entitled "Carrier Communication Method, Device and System For Low-Voltage Power Line," filed Dec. 20, 2016, the disclosure of which is hereby incorporated entirely herein by reference.

This application is also a Section 371 National Stage application of the earlier Patent Cooperation Treaty Application to Qu et al., entitled "Carrier Communication Method, Device and System For Low-Voltage Power Line," application serial number PCT/CN2017/083546, filed May 9, 2017, now pending, the disclosure of which is hereby incorporated entirely herein by reference.

BACKGROUND

1. Technical Field

The present invention relates to the field of power line communication technology, particularly to a carrier communication method, device and system of low-voltage power lines of low-voltage power lines.

2. Background

A three-phase low-voltage power supply and distribution network consists of a three-phase alternating current transformer, a single-phase or three-phase electric energy meter, and basic elements such as various electrical equipment and transmission cables. The three-phase alternating current transformer transforms the medium-high voltage alternating current on the electric mains into common 220V (or 110V) low-voltage alternating current, the three-phase alternating current is evenly distributed to users, and there is an electric energy meter at each user for metering consumed electric energy. Most of the users have access to one of the three phases, the service wire comprises a phase line and a neutral line, also part of the users uses all the three-phase alternating current. According to the importance of users' power load, the same user may access multiple independent power supply lines in reserve for each other.

Connection of the low-voltage power supply and distribution network usually adopts a three-phase four-wire or a three-phase five-wire system, three-phase refers to A, B and C phase of the three-phase alternating current, four-wire refers to three phase lines (L) and a neutral line (N), and five-wire refers to three phase line (L), a neutral line (N) and a protective earth wire (PE). In normal operation, the protective earth wire does not transfer current.

The region for which power is provided by the three-phase alternating current transformer is known as a court, the court may have a concentrator in charge of automatically collecting power consumption information of all electric energy meters therein. The concentrator is usually arranged adjacent to the transformer, facilitating intercommunication with electric energy meters on different phase lines by means of power line carriers. Between the phase lines and the neutral line, electrical signals couple due to various reasons, and the inter-phase coupling is stronger particularly for medium and high frequency signals over 2 MHz; as the carrier frequency increases, attenuation is even more obvious at high frequencies along the power lines, leading to a gradual decrease in inter-phase coupling intensity of the signals, greatly lowering the reliability of power line carrier communication.

SUMMARY

The technical problem to be solved by the present invention is to provide a carrier communication method, device and system for low-voltage power lines with high reliability, in light of the carrier communication of power lines in the prior art which has low reliability.

One aspect of embodiments of the present invention provides a carrier communication method for low-voltage power lines, including acquiring communication data comprising user data transmitted during communication and frame control data for assisting decoding of the user data; encoding the communication data using orthogonal space-time block codes and generating multipath transmission signals, in the case of unknown channel status; and transmitting the multipath transmission signals to an electric energy meter respectively via three-phase power lines.

Optionally, the multipath transmission signals are two paths of transmission signals, and the transmitting the multipath transmission signals to an electric energy meter respectively via three-phase power lines includes transmitting one path of the transmission signals to any one phase of the three-phase power lines, while transmitting the other path of the transmission signals simultaneously to the other two phases of power lines.

Optionally, the carrier communication method may include receiving, at a receiving unit, status information of a downlink channel transmitted by the electric energy meter, after an initial bidirectional link is established by a concentrator and the electric energy meter; and encoding the communication data, by a second modulation unit, through weighting of one right singular value vector of a channel transfer function matrix and transmission frequency domain complex signals.

Optionally, an encoding matrix is:

$$Z_{spot\_bf,k} = V_0 * S_k$$

wherein, Zspot_bf,k is three frequency domain complex signals respectively transmitted at three ports corresponding to sub-carrier k, $S_k$ is a post-mapping complex signal of a to-be-encoded constellation, and $V_0$ is a three-row one-column right singular value vector.

Optionally, generating multipath transmission signals includes respectively conducting fast inverse Fourier transform to the encoded multiple initial signals, and inserting a cyclic prefix and a leading symbol to obtain the multipath transmission signal.

Another aspect of the embodiments of the present invention provides a carrier communication device of low-voltage power lines, including an acquisition unit, for acquiring communication data comprising user data transmitted during communication and frame control data for assisting decoding of the user data; a first modulation unit, for encoding the communication data using orthogonal space-time block codes and generating multipath transmission signals, in the case of unknown channel status; and a transmission unit, for transmitting the multipath transmission signals to an electric energy meter respectively via three-phase power lines.

Optionally, the multipath transmission signals are two paths of transmission signals, and the transmission unit includes a transmission module, for transmitting one path of the transmission signals to any one phase of the three-phase power lines, while transmitting the other path of the transmission signals simultaneously to the other two phases of power lines.

Optionally, the carrier communication device further includes: a receiving unit, for receiving status information of a downlink channel transmitted by the electric energy meter, after an initial bidirectional link is established by a concentrator and the electric energy meter; and a second modulation unit, for encoding the communication data through weighting of one right singular value vector of a channel transfer function matrix and transmission frequency domain complex signals.

Optionally, the first modulation unit includes: a processing module, for respectively conducting fast inverse Fourier transform to the encoded multiple initial signals, and inserting a cyclic prefix and a leading symbol to obtain the multipath transmission signal.

Another aspect of the embodiments of the present invention provides a carrier communication system of low-voltage power lines, including a concentrator and at least one electric energy meter connected with the concentrator via three-phase power lines, the carrier communication system is used for performing the carrier communication method; the three-phase power lines include an A-phase phase line, a B-phase phase line, a C-phase phase line and a neutral line; the concentrator includes: a first signal transmission module and a first signal receiving module, respectively connected with the A-phase phase line and the neutral line; a second signal transmission module and a second signal receiving module, respectively connected with the B-phase phase line and the neutral line; a third signal transmission module and a third signal receiving module, respectively connected with the C-phase phase line and the neutral line; and the electric energy meter comprises a transmission module and a receiving module, respectively connected with at least one phase line and the neutral line.

According to the embodiments of the present invention, the MISO encoding for the downlink to transmit the communication data adopts orthogonal space-time block codes in the case of the concentrator not knowing the channel status, so as to acquire an utmost spatial diversity gain, which is done by means of fully employing the characteristic of distinct inter-phase coupling of electrical signals at medium-and-high frequencies along power lines, and adopting various space-time encoding and decoding technologies, thereby improving the reliability of power line carrier communication between the concentrator and the electric energy meter.

BRIEF DESCRIPTION OF THE DRAWINGS

Embodiments will hereinafter be described in conjunction with the appended drawings, where like designations denote like elements, and.

DESCRIPTION

This disclosure, its aspects and embodiments, are not limited to the specific components, assembly procedures or method elements disclosed herein. Many additional components, assembly procedures and/or method elements known in the art consistent with the intended peak power and peak-to-average power ratio systems and related methods will become apparent for use with particular embodiments from this disclosure. Accordingly, for example, although particular embodiments are disclosed, such embodiments and implementing components may comprise any shape, size, style, type, model, version, measurement, concentration, material, quantity, method element, step, and/or the like as is known in the art for such peak power and peak-to-average power ratio systems and related methods, and implementing components and methods, consistent with the intended operation and methods:

In the description of the present invention, it should be noted that, orientation or position relationships indicated by terms such as "centre", "upper", "lower", "left", "right", "vertical", "horizontal", "inner", "outer", etc. are orientation or position relationships indicated on the basis of the accompanying drawings, only intended to facilitate description or simplify description of the present invention, rather than indicating or implying that the involved device or element shall have specific orientations, or be configured and operated specifically, and therefore shall not be construed as limitations to the present invention. In addition, terms such as "first", "second", "third", which are merely intended to deliver description, can not be construed as indicating or implying relative importance.

In the description of the present invention, it should be noted that, unless specified and defined otherwise, the terms of "installation", "interconnection" and "connection" shall be understood in a broad sense, for example, a fixed connection, a removable connection, an integral connection, a mechanical connection, an electrical connection, a direct connection, an indirect connection via intermediate medium, or further, internal communication between two elements, a wireless connection, or a wired connection. Case-by-case interpretation can be made to the above terms in the present invention by one with ordinary skill in the art.

In addition, technical features involved in different implementations described in the present invention can be combined with each other as long as they do not constitute contradictions.

Figure 1:
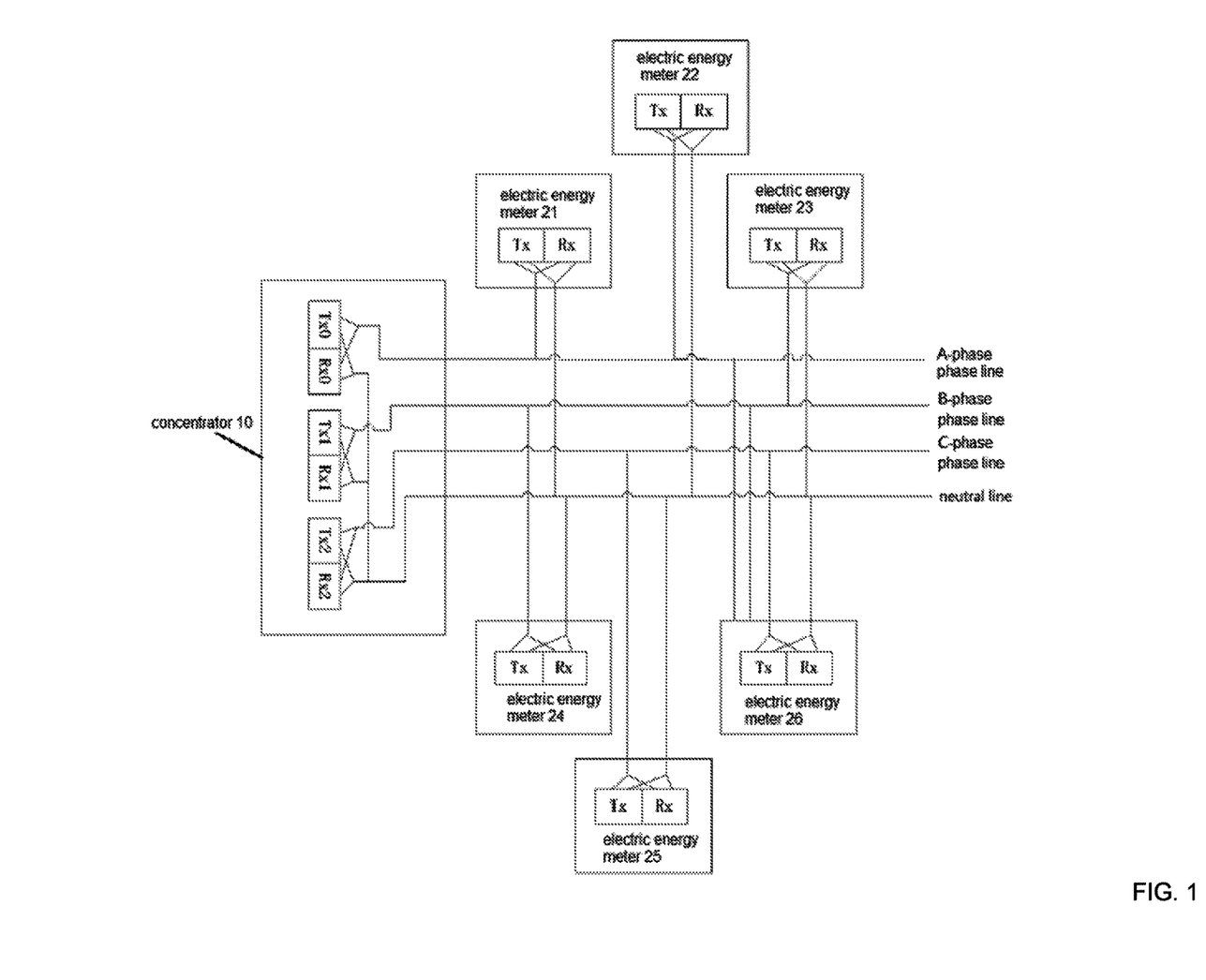
FIG. 1 is a diagram illustrating an example of a carrier communication system of low-voltage power lines in an embodiment of the present invention.

An embodiment of the present invention provides a carrier communication system of low-voltage power lines, as shown in FIG. 1, the system includes: a concentrator 10 and multiple electric energy meters (including an electric energy meter 21, an electric energy meter 22, an electric energy meter 23, an electric energy meter 24, an electric energy meter 25, and an electric energy meter 26), the concentrator 10 is connected with the electric energy meters via three-phase power lines which include an A-phase phase line, a B-phase phase line, a C-phase phase line and a neutral line.

The concentrator 10 includes: a first signal transmission module Tx0 and a first signal receiving module Rx0, respectively connected with the A-phase phase line and the neutral line; a second signal transmission module Tx1 and a second signal receiving module Rx1, respectively connected with the B-phase phase line and the neutral line; a third signal transmission module Tx2 and a third signal receiving module Rx2, respectively connected with the C-phase phase line and the neutral line. The electric energy meters include a transmission module Tx and a receiving module Rx, respectively connected with the at least one phase line and the neutral line.

Specifically, in the example shown in FIG. 1, the concentrator is connected with the electric energy meters, the electric energy meter 21, the electric energy meter 22, the electric energy meter 23, the electric energy meter 24 and the electric energy meter 25 are each a single-phase electric energy meter, a communication module (including a receiving module and a transmission module, similarly hereinafter) of the electric energy meters 21 and 22 is connected with a communication module of the concentrator 10 via the A-phase phase line and the neutral line; a communication module of the electric energy meters 23 and 24 is connected with the communication module of the concentrator 10 via the B-phase phase line and the neutral line; a communication module of the electric energy meter 25 is connected with the communication module of the concentrator 10 via the C-phase phase line and the neutral line; the electric energy meter 26 is a three-phase electric energy meter, with a communication module connected with the communication module of the concentrator 10 via the C-phase phase line and the neutral line. The communication module of the concentrator 10 has three sets of receiving and transmission units, respectively connected with the A, B and C phase line-neutral line simultaneously.

In an embodiment of the present invention, the communication module of the concentrator is simultaneously connected with three pairs of phase lines-neutral line, the communication module of the single-phase electric energy meter is connected with the single pair of phase line-neutral line, and the communication module of the three-phase electric energy meter is connected with any pair among the three pairs of phase line-neutral line. In this way, a multiple-input-single-output (Multiple Input Single Output, MISO) downlink channel is formed between the signal transmission module of the concentrator and the receiving module of the electric energy meter; and a single-input-multiple-output (Single Input Multiple Output, SIMO) uplink channel is formed between the transmission module of the electric energy meter and the signal receiving module of the concentrator. It should be noted that, although being connected with three pairs of phase line-neutral line, the communication module of the concentrator can still choose one physical link therefrom to realize reception and transmission, at which moment both the uplink and downlink are a single input single output (Single Input Single Output, SISO) channel.

Figure 2:
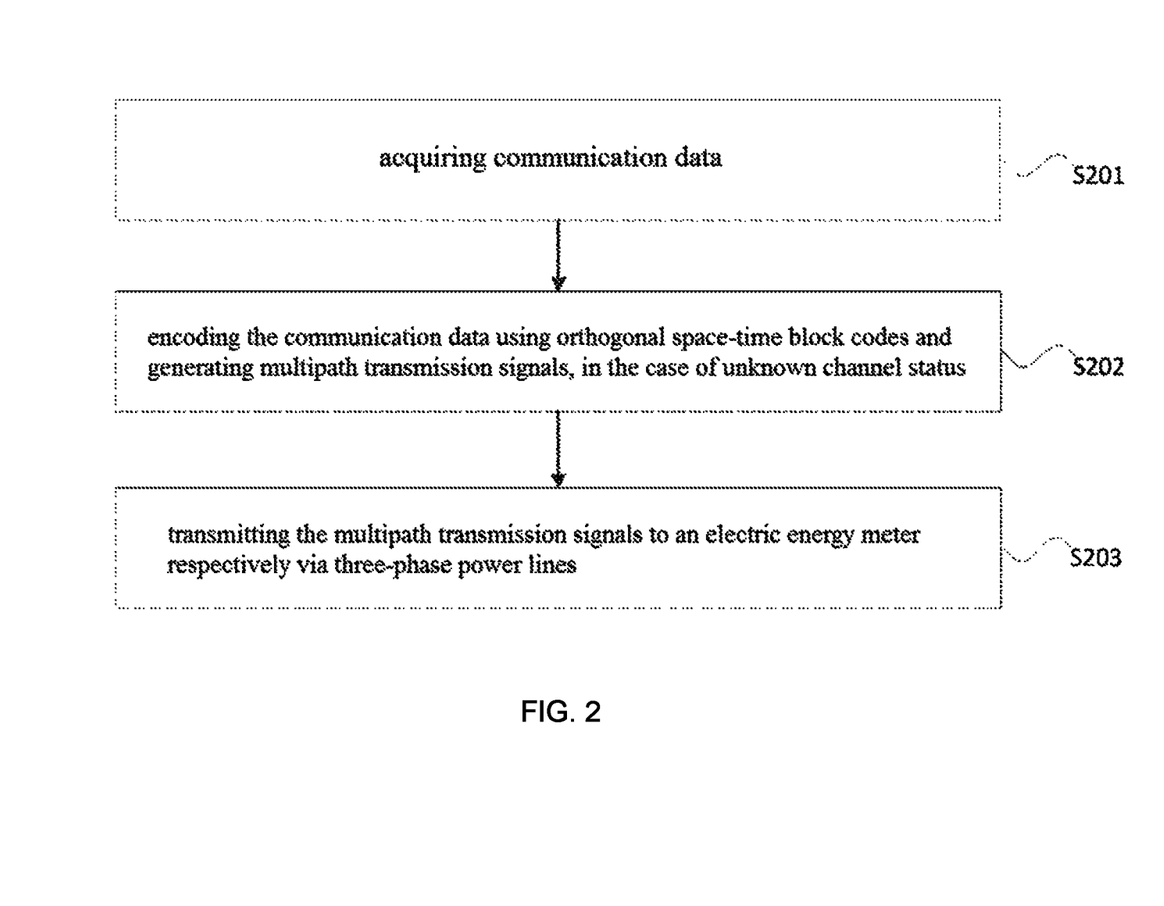
FIG. 2 is a flowchart illustrating a specific example of a carrier communication method of low-voltage power lines in an embodiment of the present invention.

This embodiment provides a carrier communication method of low-voltage power lines, which can be used in a carrier communication system provided by the embodiments of the present invention. The method relates to three phase lines and a neutral line of a low-voltage power supply and distribution network, and is applicable to both a three-phase four-wire power supply and distribution network and a three-phase five-wire power supply and distribution network. As shown in FIG. 2, the method includes:

Step S201, acquiring communication data including user data transmitted during communication and frame control data, the latter being data used for assisting decoding of the user data, for example, modulation mode, type of forward error correction (FEC) codes, etc.

Figure 3:
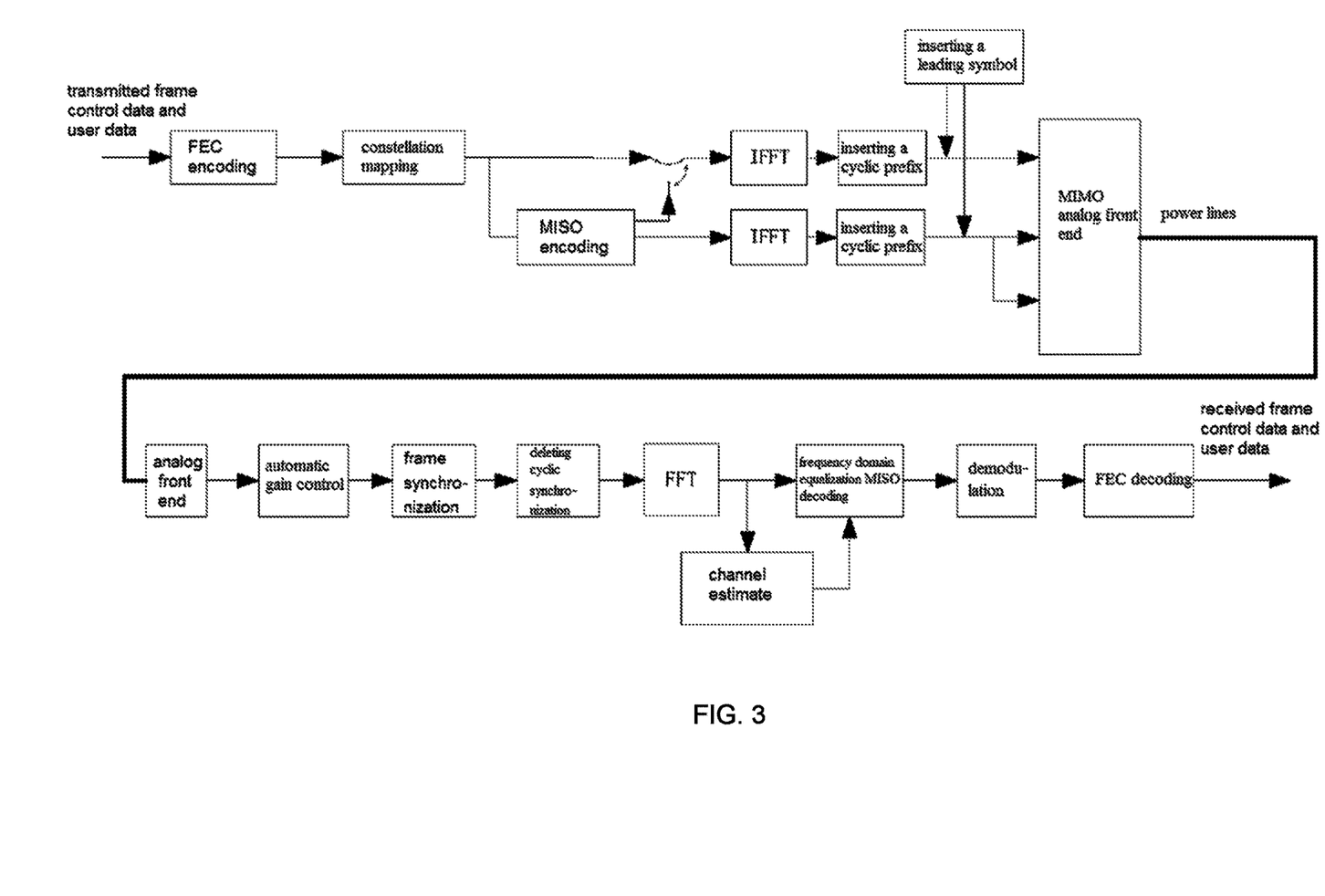
FIG. 3 is a schematic block diagram illustrating a downlink system from a signal transmission module of a concentrator to a receiving module of an electric energy meter in an embodiment of the present invention.

Step S202, encoding the communication data using orthogonal space-time block codes and generating multipath transmission signals, in the case of unknown channel status. As shown in FIG. 3, the generating multipath transmission signals includes: respectively conducting fast inverse Fourier transform to the encoded multiple initial signals, and inserting a cyclic prefix and a leading symbol to obtain the multipath transmission signal.

Step S203, transmitting the multipath transmission signals to an electric energy meter respectively via three-phase power lines.

The carrier communication method in the embodiment of the present invention is a downlink communication method, operating under a principle shown in FIG. 3, with a simplified frequency domain model of:

$$\vec{X} = F * \vec{S}$$
$$Y_k^n = \sum_m H_{k,i\ deal}^{n,m} * X_k^{n,m} + W_k^n$$

wherein, $\vec{S}$ is a symbol vector of a post-mapping frequency domain constellation, $\vec{X}$ is a transmission symbol vector of the frequency domain after MISO encoding, F is an MISO encoding matrix, $X_k^{n,m}$ is a component element of $\vec{X}$, with a corresponding OFDM symbol sequence number n, a sub-carrier sequence number k, and indicating transmitting a frequency domain transmission symbol of port m; $H_{k,i\ deal}^{n,m}$ is a channel transfer function, $W_k^n$ is equivalent noise interference of the frequency domain, $Y_k^n$ is a frequency domain indication corresponding to reception signals, n is an OFDM symbol sequence number, k is a sub-carrier sequence number, and m is a transmission port sequence number.

In the case of the concentrator not knowing the channel status, the MISO encoding for the downlink to transmit the communication data adopts orthogonal space-time block codes (Orthogonal Space Time Block Code), so as to acquire an utmost spatial diversity gain, which is done by means of fully employing the characteristic of distinct inter-phase coupling of electrical signals at medium-and-high frequencies along power lines, and adopting various space-time encoding and decoding technologies, thereby improving the reliability of power line carrier communication between the concentrator and the electric energy meter.

As an alternative embodiment, in order to reduce the complexity, the multipath transmission signals are two paths of transmission signals, and the transmitting the multipath transmission signals to an electric energy meter respectively via three-phase power lines includes: transmitting one path of the transmission signals to any one phase of the three-phase power lines, while transmitting the other path of the transmission signals simultaneously to the other two phases of power lines.

The embodiment of the present invention adopts a solution involving orthogonal space-time block codes with 2 ports and a code rate of 1, wherein, the encoding matrix is as follows:

$$Z_{stbc} = \begin{pmatrix} s_1 & s_2 \\ -s_2^* & s_1^* \end{pmatrix}$$

$\{S_1, S_2\}$ is 2 post-mapping complex signals of a to-be-encoded constellation, respectively deriving from the same sub-carrier of two adjacent OFDM symbols, $\{S_1^*, -S_2^*\}$ is respectively a conjugated signal of $S_1$ and a conjugated-and-inverted signal of $S_2$, each column of the $Z_{stbc}$ matrix represents post-encoding complex signals transmitted on the same available sub-carrier and at 2 ports respectively, i.e., the 2 post-mapping complex signals of a to-be-encoded constellation are mapped to 2 ports and 4 sub-carriers by this encoding matrix. One path in the final two paths of transmission signals can be repeatedly transmitted to 2 pairs of L-N lines. For example, the first path is transmitted to the A phase, and the second path is transmitted to the B and C phases simultaneously.

As another optional embodiment, the carrier communication method may include receiving, at a receiving unit, status information of a downlink channel transmitted by the electric energy meter, after an initial bidirectional link is established by a concentrator and the electric energy meter; and encoding the communication data, by a second modulation unit, through weighting of one right singular value vector of a channel transfer function matrix and transmission frequency domain complex signals.

After an initial bidirectional link is established by the communication module of the concentrator and the communication module of the electric energy meter, the communication module of the electric energy meter can feed back partial or all status information of the downlink channel to the communication module of the concentrator. At this moment downlink MISO encoding can be realized through weighting of one right singular value vector of the channel transfer function matrix and the transmission frequency domain complex signals. This MISO encoding mode can achieve additional array gain in addition to utmost spatial diversity gain.

Assuming an OFDM symbol has a sequence number n, the channel corresponding to the sub-carrier k is a complex matrix $H_k^n$, the singular value decomposition (Singular Value Decomposition, SVD) of which can be represented as:

$$H_k^n = (H_k^{n,0} H_k^{n,1} H_k^{n,2}) = U\Sigma V^H$$

wherein $V^H$ indicates conjugate transpose of the V matrix.

Taking into account that there is only one port at the receiving terminal, the rank $(H_k^n)$ of $H_k^n$ has a maximum value of 1, singular value decomposition of $H_k^n$ can be further simplified as:

$$H_k^n = \bigcup \left(\sum_0 \ 0 \ 0\right) \begin{pmatrix} V_0^H \\ V_1^H \\ V_2^H \end{pmatrix} = \bigcup \sum_0 V_0^H$$

Wherein, U is a 1-row-1-column left singular value vector, $\Sigma_0$ is a non-zero singular value, $V_0$ is a 3-row-1-column right singular value vector, and $V_0^H$ is a conjugate transpose of $V_0$. The downlink MISO encoding matrix is:

$$Z_{spot\_bf,k} = V_0 * S_k$$

wherein, $Z_{spot\_bf,k}$ is three frequency domain complex signals respectively transmitted at three ports corresponding to sub-carrier k, $S_k$ is a post-mapping complex signal of a to-be-encoded constellation, and $V_0$ is a three-row one-column right singular value vector. The MISO encoding herein has a rate of 1, i.e., one post-mapping complex signal of a constellation is mapped onto the same one sub-carrier of 3 ports.

Figure 4:
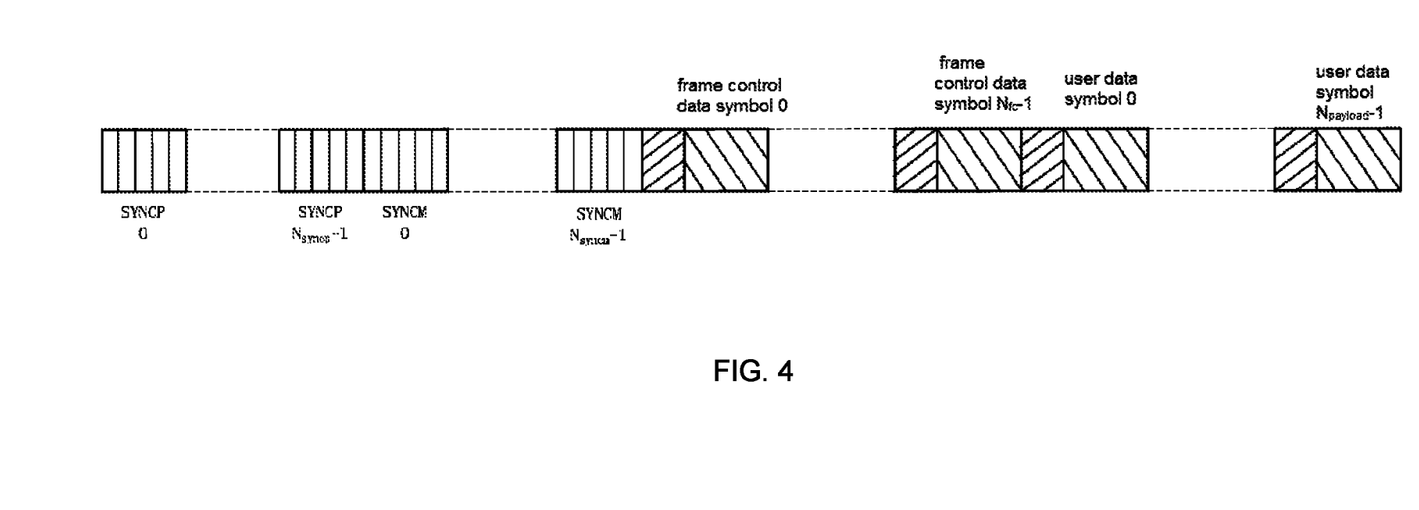
FIG. 4 is a diagram illustrating the data frame structure of a physical level in an embodiment of the present invention.

The data frame structure at the physical level in the embodiment of the present invention uses the same data frame structure in the downlink and uplink channels, as shown in FIG. 4; leading symbols SYNCP and SYNCM (denoted by rectangular blocks with vertical lines) are generated from the known frequency domain pilot frequency data undergoing inversed fast Fourier transform (Inversed Fast Fourier Transform, IFFT), wherein SYNCM=–SYNCP. The frame control data (denoted by rectangular blocks with leftward oblique lines) and the user data (denoted by rectangular blocks with rightward oblique lines) are quadrature modulation (OFDM) symbols with a cyclic prefix. A receiver can automatically adjust the gain of a receiver signal amplifier using the leading symbols to obtain synchronization information and auxiliary channel estimation. The frame control data contains some information to help decode the user data, such as modulation, types of forward error correction (FEC) codes, etc.

In this embodiment, the construction of the leading symbols of the downlink communication is specifically performed in a process as follows:

When the communication module of the concentrator communicates with the communication module of the electric energy meter in a SISO mode, the SYNCP symbol is generated from known frequency domain pilot frequency data undergoing IFFT, i.e., the frequency domain symbol corresponding to the SYNCP symbol is a known sequence $\{p(k)\}$, wherein k is a sub-carrier sequence number.

When the MISO downlink adopts orthogonal space-time coding, two paths of leading symbols are likewise generated from known frequency domain pilot frequency data undergoing IFFT, the first path of leading symbols is totally the same as the SISO mode, the first Nsyncp+2 symbols in the second path of leading symbols are totally the same as the leading symbols of the SISO mode, the last Nsyncm–2 symbols take inverse values of corresponding symbols of the SISO mode. In other words, if NSYNCP=10, NSYNCM=6, and SYNCP=L, then corresponding leading symbols of the two paths are:

The first path: +L, +L, +L, +L, +L, +L, +L, +L, +L, +L, –L, –L, –L, –L, –L, –L;

The second path: +L, +L, +L, +L, +L, +L, +L, +L, +L, +L, –L, –L, +L, +L, +L, +L.

When the MISO downlink encoding performs weighting using an Hmatrix right singular value, the SYNCP symbols of 3 ports are also generated from known frequency domain pilot frequency data undergoing IFFT, but their respective corresponding known sequences of the frequency domain should be constructed in the following manner:

$$p_m(k) = V_{0,m} * p(k)$$

wherein $V_{0,m}$ is the value of an $m^{th}$ row of the column vector.

Figure 5:
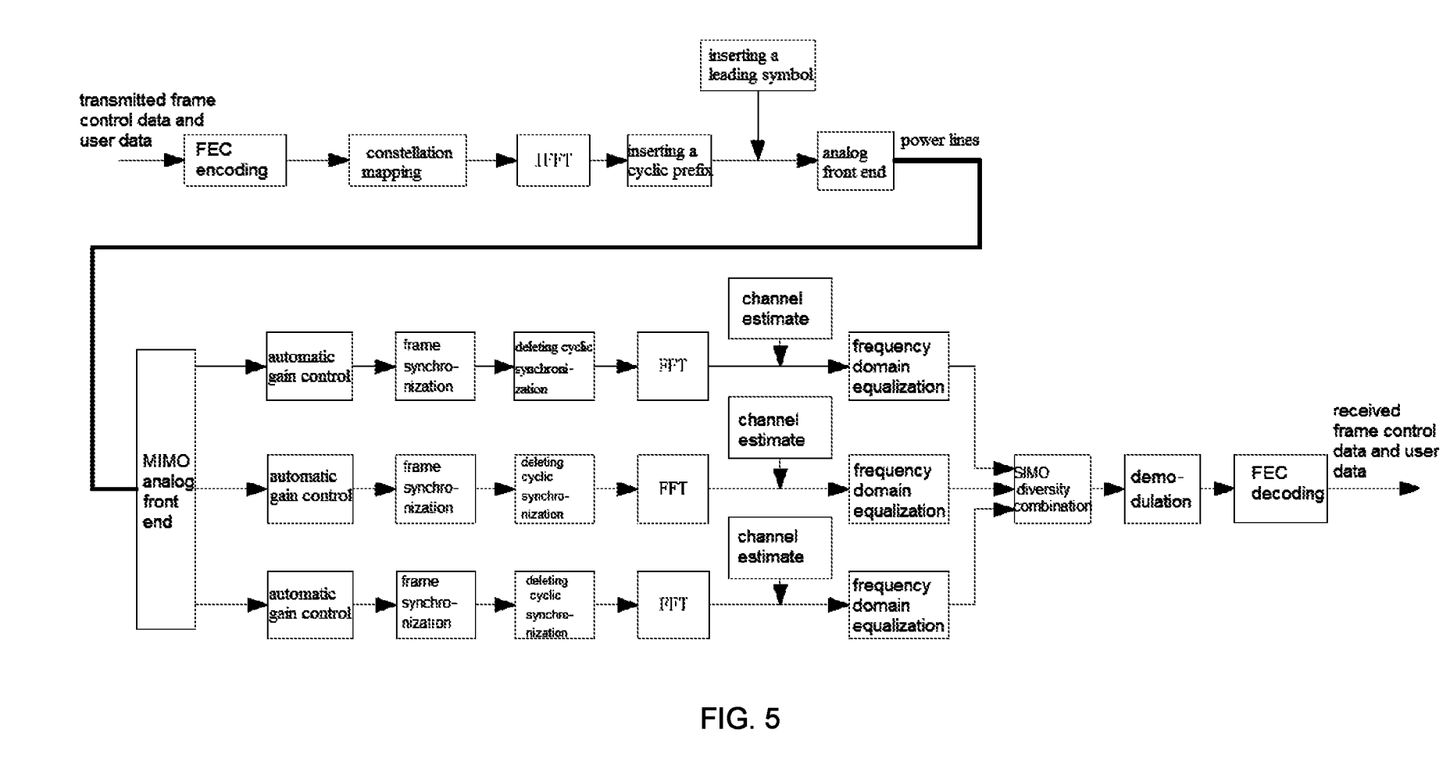
FIG. 5 is a schematic block diagram illustrating an uplink system from a transmission module of the electric energy meter to a signal receiving module of the concentrator in an embodiment of the present invention.

In an embodiment of the present invention, an uplink transmission and receiving model word under a principle as shown in FIG. 5, and an simplified frequency domain model of the uplink system is:

$$Y_k^{n,m} = H_{k,i\ deal}^{n,m} * X_k^n + W_k^{n,m}$$

wherein, $X_k^n$ is an frequency domain transmission symbol for an OFDM symbol n and a sub-carrier k, $H_{k,i\ deal}^{n,m}$ is a channel transfer function, $W_k^{n,m}$ is equivalent noise interference of the frequency domain, wherein n is an OFDM symbol sequence number, k is a sub-carrier sequence number, and m is the sequence number of a receiving port.

The concentrator has three independent receiving and processing channels, and is able to obtain up to three times array gain, for instance, at a maximum rate, by adopting diversity and combining techniques. At a matter of face, the array gain of the concentrator, which may be well below its maximum possible gain for being subjected to effect by correlation among the three-phase cables, is still obviously higher than using a single-phase interface.

The construction of leading symbols SYNCP of uplink communication is totally the same as that of the SISO communication mode, and will not be repeated herein.

In the embodiment of the present invention, coupling effect of interphase signals are employed in a three-phase power supply and distribution network, and spatial diversity transmission and reception techniques are introduced by the communication module of the concentrator, leading to efficient improvement in reliability of the communication between a concentrator and an electric energy meter of users. In the meantime, requirements for signal processing by the communication module of the electric energy meter remain almost the same as those in an SISO communication mode, hardly making any contribution to an increase in the cost of the whole system.

Figure 6:
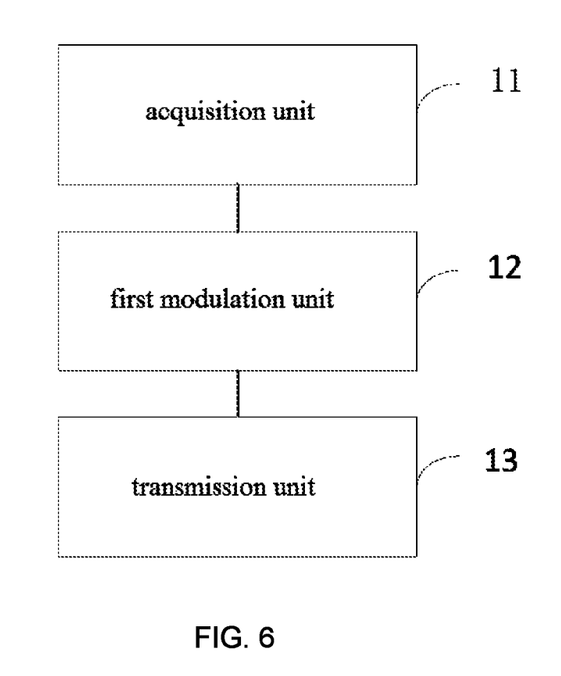
FIG. 6 is a diagram illustrating an example of a carrier communication device of low-voltage power lines in an embodiment of the present invention.

An embodiment of the present invention further provides a carrier communication device of low-voltage power lines, which can be used to perform the carrier communication method provided by the above embodiments of the present invention, as shown in FIG. 6, the device includes: an acquisition unit 11, a first modulation unit 12 and a transmission unit 13.

The acquisition unit 11 is used for acquiring communication data comprising user data transmitted during communication and frame control data for assisting decoding of the user data.

The first modulation unit 12 is used for encoding the communication data using orthogonal space-time block codes and generating multipath transmission signals, in the case of unknown channel status. The first modulation unit 12 includes a processing module, for respectively conducting fast inverse Fourier transform to the encoded multiple initial signals, and inserting a cyclic prefix and a leading symbol to obtain the multipath transmission signal.

The transmission unit 13 is used for transmitting the multipath transmission signals to an electric energy meter respectively via three-phase power lines.

The carrier communication method in the embodiment of the present invention is a downlink communication method, working under a principle as shown in FIG. 3, with a simplified frequency domain model of:

$$\vec{X} = F * \vec{S}$$
$$Y_k^n = \sum_m H_{k,i\ deal}^{n,m} * X_k^{n,m} + W_k^n$$

wherein, $\vec{S}$ is a symbol vector of a post-mapping frequency domain constellation, $\vec{X}$ is a transmission symbol vector of the frequency domain after MISO encoding, F is an MISO encoding matrix, $X_k^{n,m}$ is a component element of $\vec{X}$, with a corresponding OFDM symbol sequence number n, a sub-carrier sequence number k, indicating transmitting a frequency domain transmission symbol of port m;

$H_{k,i\ deal}^{n,m}$ is a channel transfer function, $W_k^n$ is equivalent noise interference of the frequency domain, $Y_k^n$ is a frequency domain indication corresponding to reception signals, n is an OFDM symbol sequence number, k is a sub-carrier sequence number, and m is a transmission port sequence number.

In the case of the concentrator not knowing the channel status, the MISO encoding for the downlink to transmit the communication data adopts orthogonal space-time block codes (Orthogonal Space Time Block Code), so as to acquire an utmost spatial diversity gain, which is done by means of fully employing the characteristic of distinct inter-phase coupling of electrical signals at medium-and-high frequencies along power lines, and adopting various space-time encoding and decoding technologies, thereby improving the reliability of power line carrier communication between the concentrator and the electric energy meter.

As an alternative implementation, in order to reduce the complexity, the multipath transmission signals are two paths of transmission signals, a transmission unit includes: a transmission module, for transmitting one path of the transmission signals to any one phase of the three-phase power lines, while transmitting the other path of the transmission signals simultaneously to the other two phases of power lines.

The embodiment of the present invention adopts a solution involving orthogonal space-time block codes with 2 ports and a code rate of 1, wherein, the encoding matrix is as follows:

$$Z_{st\ bc} = \begin{pmatrix} s_1 & s_2 \\ -s_2^* & s_1^* \end{pmatrix}$$

$\{S_1, S_2\}$ is 2 post-mapping complex signals of a to-be-encoded constellation, respectively deriving from the same sub-carrier of two adjacent OFDM symbols, $\{S_1^*, -S_2^*\}$ is respectively a conjugated signal of $S_1$ and a conjugated-and-inverted signal of $S_2$, each column of the $Z_{stbc}$ matrix represents post-encoding complex signals transmitted on the same available sub-carrier and at 2 ports respectively, i.e., the 2 post-mapping complex signals of a to-be-encoded constellation are mapped to 2 ports and 4 sub-carriers by this encoding matrix. One path in the final two paths of transmission signals can be repeatedly transmitted to 2 pairs of L-N lines. For example, the first path is transmitted to the A phase, and the second path is transmitted to the B and C phases simultaneously.

As another optional implementation, the device in the embodiment of the present invention further includes: a receiving unit, for receiving status information of a downlink channel transmitted by the electric energy meter, after an initial bidirectional link is established by a concentrator and the electric energy meter; and a second modulation unit, for encoding the communication data through weighting of one right singular value vector of a channel transfer function matrix and transmission frequency domain complex signals.

After an initial bidirectional link is established by the communication module of the concentrator and the communication module of the electric energy meter, the communication module of the electric energy meter can feed back partial or all status information of the downlink channel to the communication module of the concentrator. At this moment downlink MISO encoding can be realized through weighting of one right singular value vector of the channel transfer function matrix and the transmission frequency domain complex signals. This MISO encoding mode can achieve additional array gain in addition to utmost spatial diversity gain.

Obviously, the above embodiments are merely intended to clearly illustrate the numerated examples rather than limit the implementations. For one with ordinary skill in the art, other different forms of modifications or changes may further be made on the basis of the aforementioned descriptions. It is neither necessary nor possible to exhaust all implementations. And modifications or changes derived herefrom obviously fall into the protection scope of the present invention.

The invention claimed is:

1. A carrier communication method of low-voltage power lines, the method comprising:
   acquiring communication data comprising user data transmitted during communication and frame control data for assisting decoding of the user data;
   encoding the communication data using orthogonal space-time block codes and, in the case of unknown channel status, generating multipath transmission signals based on the encoded communication data; and
   transmitting the multipath transmission signals to an electric energy meter via three-phase power lines;
   wherein the multipath transmission signals are transmitted using two paths of transmission signals, and transmitting the multipath transmission signals to an electric energy meter via three-phase power lines further comprises:
   transmitting one path of the multipath transmission signals to any one phase of the three-phase power lines while transmitting a second path of the multipath transmission signals simultaneously to the other two phases of the three-phase power lines.

2. The method of claim 1, further comprising:
   receiving status information of a downlink channel transmitted by the electric energy meter after an initial bidirectional link is established by a concentrator and the electric energy meter; and
   encoding the communication data through weighting of one right singular value vector of a channel transfer function matrix and transmission frequency domain complex signals.

3. The method of claim 2, wherein an encoding matrix used in encoding the communication data is:

$$Z_{spot\_bf,k} = V_0 * S_k$$

wherein, $Z_{spot\_bf,k}$ is three frequency domain complex signals respectively transmitted at three ports corresponding to sub-carrier k, $S_k$ is a post-mapping complex signal of a to-be-encoded constellation, and $V_0$ is a three-row one-column right singular value vector.

4. The method of claim 1, wherein generating multipath transmission signals further comprises:
   conducting fast inverse Fourier transform of the encoded multiple initial signals, and then inserting a cyclic prefix and a leading symbol to obtain the multipath transmission signal.

5. A carrier communication device for low-voltage power lines, the device comprising:
   an acquisition unit configured to acquire communication data comprising user data transmitted during a communication and comprising frame control data for assisting with decoding of the user data;
   a first modulation unit configured to encode the communication data using orthogonal space-time block codes and, in the case of unknown channel status, to generate multipath transmission signals based on the encoded communication data; and
   a transmission unit configured to transmit the multipath transmission signals to an electric energy meter via three-phase power lines;
   wherein the multipath transmission signals are transmitted using two paths of transmission signals, and the transmission unit further comprises:
   a transmission module configured to transmit one path of the transmission signals to any one phase of the three-phase power lines, while transmitting a second path of the transmission signals simultaneously to the other two phases of the three-phase power lines.

6. The device of claim 5, further comprising:
   a receiving unit configured to receive status information of a downlink channel transmitted by the electric energy meter after an initial bidirectional link is established by a concentrator and the electric energy meter; and
   a second modulation unit configured to encode the communication data through weighting of one right singular value vector of a channel transfer function matrix and transmission frequency domain complex signals.

7. The device of claim 5, wherein the first modulation unit comprises:
   a processing module conducting fast inverse Fourier transform of the encoded multiple initial signals, and then inserting a cyclic prefix and a leading symbol to obtain the multipath transmission signal.

* * * * *